G. FLETCHER, Sr., & T. BARNES.
Grain-Drill.
No. 7,213.
Patented Mar 26, 1850
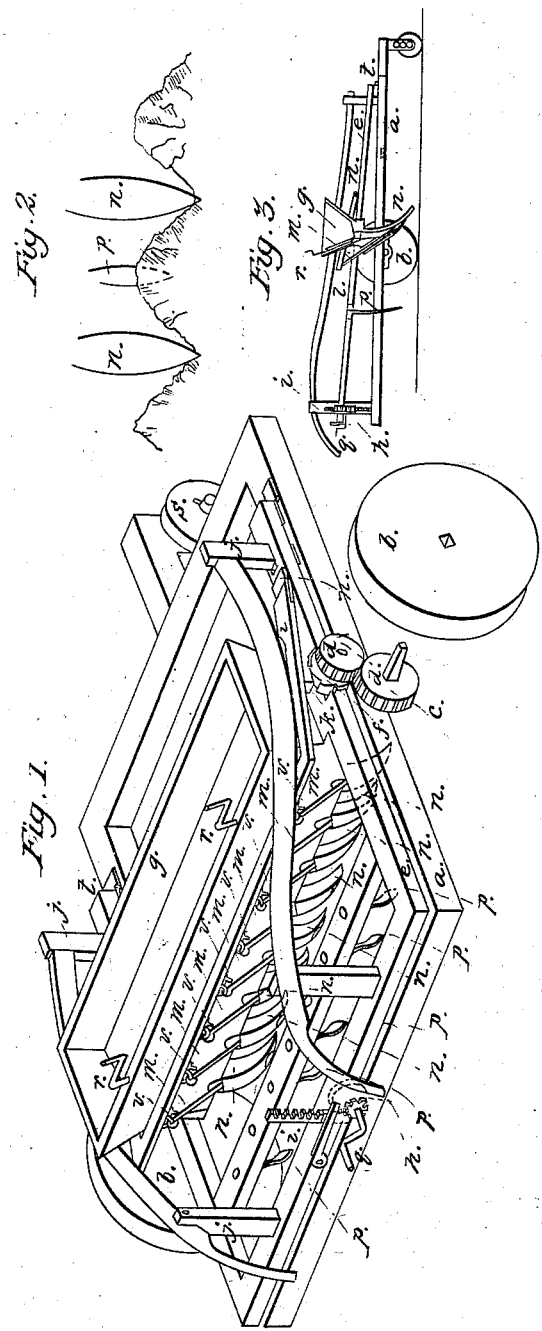

UNITED STATES PATENT OFFICE.

GEORGE FLETCHER, SR., AND TURNER BARNES, OF GREENSBURG, INDIANA.

IMPROVEMENT IN SEED-PLANTERS.

Specification forming part of Letters Patent No. 7,213, dated March 26, 1850.

*To all whom it may concern:*

Be it known that we, GEORGE FLETCHER, Sr., and TURNER BARNES, of Greensburg, Decatur county, Indiana, have invented new and useful Improvements in Seed-Planters or Machines for Sowing Seed in Drills; and we do hereby declare the following to be a full, clear, and exact description of the nature, construction, and operation of the same, reference being had to the annexed drawings, which are made part of this specification, in which—

Figure 1 is a general perspective view of the machine. Fig. 2 shows the furrows cast up by the seeding-share, with the position of the secondary share in reference to the previous ones; and Fig. 3 shows the method of hinging the different frames together and manipulating so as to throw the seeding and cleaning apparatus out of gear at pleasure, also the mode of giving motion to the cleaner.

The first part of our invention consists in the introduction of a cleaning-rod into the hollow share which cuts the furrow and through which the seed falls, so as to prevent the clogging and accumulation of earth in the orifice, which is fatal to the operation of the seeder.

The second part of our invention consists in placing a smaller share midway of the intervals of the former ones, so as to follow in the space between them, thereby dividing the ridge of earth cast up by them and throwing it to either side, so as more perfectly to cover the seed.

The third part of our invention consists in the method by which the whole cleaning and seeding apparatus is thrown out of gear with the driving-wheels which support the carriage, by hinging the frame which supports and contains the whole series of shares, secondary shares, cleaners, seed-trough, and feeding-screw to the frame-work resting immediately upon the axles, and raising or lowering it in or out of gear with the cog-wheel on the driving-wheel axle, by means of a rack and pinion with a click falling into the intervals of the teeth of same for retaining it in position.

We have seen many seeding-machines with a hollow share to admit the passage of the grain through them. This forms no part of our invention, but was a great improvement upon the old system of feed-cups suspended from the feed-trough and located immediately in the rear of the share which formed the furrow. This plan is still generally adopted in England. These machines are very complicated and expensive, the eight-row drill, (the number represented in our model and drawings,) costing from twenty-five pounds fifteen shillings to thirty-six pounds fifteen shillings, sterling, according to finish and the work to be performed. It was, as we have remarked, a valuable improvement, but was subjected to this disadvantage that the orifice through which the seed was discharged from the hollow share was liable to become clogged with earth, particularly in certain stiff and tenacious soils and in wet weather. The improvement forming the first part of our invention was intended to and does remedy this difficulty. On the axle of the wheel on which the machine runs is a spur-wheel, which gears into another upon the feeding-screw shaft and drives it. This or a similar one on the same shaft is caused to raise a frame which is hinged to the frame carrying the seeding apparatus by the cogs of the wheel coming in contact with a lug on the under part of the frame, forming the cogs into a series of cams. The frame descends between each interval of cogs by its gravity, thus causing a rapid vertical motion. To this frame are attached rods which are introduced into the hollow of the shares, and run their entire length to their orifices, their movement being thus continuous whenever the seeding arrangement is thrown into gear with the driving-wheels, and being hung loosely in the channel which they traverse their effect is to detach and expel any clod or other obstruction that may find its way into the orifice. In the drawings the cogs or cams on the wheel operating the cleaning-frame are shown ratchet-shaped. This is not material, but it is better to make the cogs symmetrical, as they will then, by making the lug with steep double faces, operate the cleaner whichever way the machine is driven.

It is a great loss on many occasions to the farmer who has gone over his fields with the seeding-machine to find that one or more of his shares have been inoperative, owing to their having become clogged and the seed consequently prevented from falling into the ground. The mistake is frequently undiscovered until the blade in the adjacent drills makes its appearance.

With regard to the secondary series of shares their utility is very obvious. The ridge cast up by the former shares is of such a form and frequently consistence that it will support itself in position when the share has passed, leaving the seed partially or wholly uncovered. The secondary share splits the ridge and covers it perfectly.

The arrangement by which the whole seeding and cleaning apparatus is thrown out of gear for the purpose of conveying the machine from place to place or turning it is this: On the frame which lies upon the axles of the wheels a second frame is hinged, forward of them, and in the rear part of the upper frame, midway of its length, is a slot traversed by a rack, fast to the lower frame. A pinion operated by a crank is attached to the upper, and on being revolved raises the upper frame, which previously lay upon the lower, thereby throwing the cog-wheels out of gear. Guides, also fixed to the lower frame, traverse slots nearer the ends of the upper. A click falls into the intervals of the cogs to retain the frame when raised in position. This arrangement was rendered more necessary in consequence of the wheels supporting the machine being upon separate axles, so as to facilitate turning the machine, which is necessarily very wide.

In the drawings, $a$, Fig. 1, is the main frame of the machine, on which all parts ultimately rest. This is supported by and runs upon wheels $b$. On the axles are spur-wheels $c$, gearing, when the frame $e$ is lowered, into a wheel, $d$, on the shaft of which is a feed-screw, (not represented,) running under the false bottom of the feeding-trough $g$. The frame $e$ is hinged at $t$ to the frame $a$, and is raised, lowered, or kept in position—that is, the wheel $d$ is thrown in or out of gear with the driving-wheel $c$—by means of a rack, $i$, fast to the lower frame, $a$, traversing a slot in the upper one, $e$, and operated by a crank, $q$, and pinion $h$. Guides $jj$ are introduced for the purpose of giving steadiness to the upper frame and preventing it from rocking upon the back center formed by the rack $i$. On the same shaft with the spur-wheel $d$ a wheel, $f$, is placed, the cogs of which operate as cams upon a lug, $k$, on the under side of a third frame, $l$, which is hinged at $u$ to the frame $e$. To the under side of this frame $l$ are staples or rings $v$, to which rods $m$ are jointed, which rods pass downward through the length of the hollow shares $n$, for purposes previously set forth. This continued raising and lowering of the frame $l$ by the cogs of the wheel $f$ operating on the lug $k$ gives the series of cleaners in the shares a more or less rapid vertical motion, calculated to remove any obstacle that may have entered the orifice of the share. In the frame $e$ is a bar, $o$, which runs from side to side of the machine, to the under part of which are attached the secondary shares $p$, whose purpose has been described. Cranks $r$, by means of screws, raise and lower a gate for supplying seed to the feed-screw, which regulates the supply to the shares. A wheel, $s$, attached regulates the depth of cut.

Fig. 3 shows by section the position of the rod $m$ in the hollow share $n$.

Fig. 2 shows the action of the shares, the ridge cast up by them, and the action of the secondary shares.

Fig. 3 is a side elevation of the machine, showing the relation the various parts bear to each other, the method of throwing in and out of gear, and the action and operation of the cleaners.

The same parts are represented by the same letters in each view.

Having thus fully described the nature and operation of our invention, what we claim as new, and desire to secure by Letters Patent, is—

The introduction of a cleaning-rod, operated as described, into the hollow share of a seed-planter for the purpose of removing extraneous matters that may have entered the orifice tending to impair or prevent the action of the machine.

GEORGE FLETCHER, Sr.
    TURNER BARNES.

Witnesses:
 EZRA LATHROP,
 LEVI P. LATHROP.